UNITED STATES PATENT OFFICE.

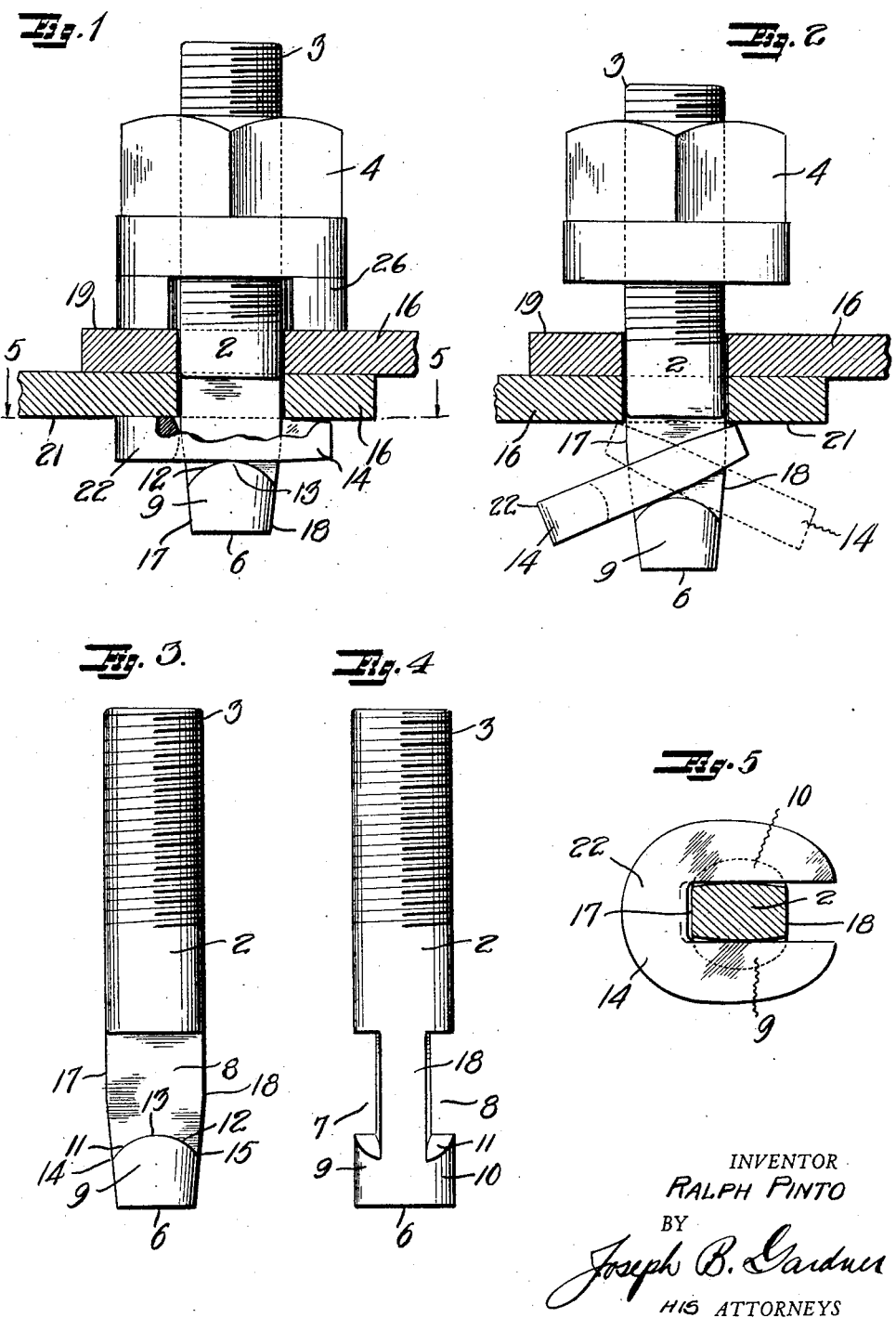

RALPH PINTO, OF OAKLAND, CALIFORNIA.

BOLT.

1,403,813. Specification of Letters Patent. Patented Jan. 17, 1922.

Application filed January 24, 1921. Serial No. 439,400.

*To all whom it may concern:*

Be it known that I, RALPH PINTO, a citizen of the United States, and a resident of Oakland, county of Alameda, and State of California, have invented a new and useful Bolt, of which the following is a specification.

My invention relates to bolts and particularly to bolts such as are used for drawing and holding a plurality of steel plates together before the latter are riveted.

An object of the invention is to provide a screw bolt from which the nut need never be removed, but is provided with a removable thrust member that may be slipped into engagement with the bolt from either of two sides of the latter and which when so engaged may be detached or removed with equal facility whether the member was slipped into engagement with the bolt at one side or the other.

The invention possesses other objects or features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a side elevation of the bolt showing it clamping two plates together, a portion of the thrust member being broken away and shown in section in order to show the construction more clearly.

Figure 2 is a similar view to Figure 1 but showing the bolt and the thrust member in loose association.

Figure 3 is a side elevation of the stud.

Figure 4 is a side elevation of the stud taken at a right angle to Figure 3.

Figure 5 is a horizontal section of the bolt, the plane of section being indicated by the line 5—5 of Figure 1.

The bolt of my invention is well adapted for use in connection with shipbuilding, particularly for bolting up shear strakes and bulkheads. As shown in the present embodiment of the invention the bolt comprises a stud 2 one end 3 of which is threaded and engaged by an ordinary nut 4. Adjacent the other end 6 and on opposite sides of the stud are formed recesses 7 and 8 which define abutments or shoulders 9 and 10 respectively. The inner face 11 of each abutment is swelled thereby forming a protuberance 12 which extends in the direction of the threaded end 3 of the bolt and whose peak 13 lies equidistant from the opposite extremities 14 and 15 of the said face.

It will be noted that the cross sectional area of the stud at that portion within which the abutments 9 and 10 are included is, as here shown, no greater than that of the transverse sectional area of any other portion of the stud. The bolt of my invention may be thus qualified as being headless. A thrust member 14 has therefore been provided which is adapted to engage in the recesses 7 and 8 and rest against the protuberances so that various elements such as the perforated plates 16 may be rigidly clamped between said member and the nut 4. The thrust member is preferably in the form of a U-washer and may be slipped into the recesses for engagement with the bolt from either side 17 or 18 of the latter.

In manipulating the bolt the nut need not be removed from the stud either in the clamping or unclamping operation but is adapted to be merely screwed back or forth as the occasion requires. To clamp the bolt about the plates the recessed end 6 is passed through the registering apertures of the plate from one side 19 thereof, and the washer 14 then slipped into the recesses from the other side 21 of the plates. After the washer is properly engaged in the recesses the nut is turned so as to cause the plates to be tightly clamped between them.

To release the bolt from the plates it is merely necessary to unscrew the nut a small amount so that the recessed end 6 of the stud may be caused to project still further through the plate. The washer 14 is then free for removal. By now referring to Figure 1 it will be noted that when the washer is in operative engagement with the stud that it rests upon the peak of the protuberances; therefore when the nut is unscrewed so that the stud will assume a position similar to that in Figure 2, the washer will fulcrum on said peak and the closed side 22 thereof, which is the heavier, will be swung downwardly, until the washer slips off the stud.

A most important feature of my present invention is that the washer 14 will slip invariably off from engagement with the stud, during the unclamping operation, irrespective of which side of bolt at which the washer was initially slipped on. In this way practically no care must be exercised by the operator to see that the washer is placed upon the stud in but one particular manner—as is usually the case. In Figure 2 of the drawings I have indicated in dotted lines the position of the washer had it been placed in engagement with the stud from the side 18.

As here shown the bolt is provided with a second U-washer 26. With the use of this washer a very small movement of the nut will be necessary to effect the clamping or releasing of the bolt, the insertion or withdrawal of the washer serving to respectively prevent or permit a corresponding longitudinal movement of the stud.

While in the drawing the bolt is shown with the threaded end upward, it is obvious that the bolt will function with equal efficiency when the recessed end is disposed on top. Furthermore it is obvious that the bolt may be disposed horizontally or obliquely; when the bolt is disposed in one of the latter positions, and in case the closed side of the washer 14 is on the upper side of the stud, a half turn of the stud will enable the washer 14 to readily slip off therefrom when it is desired to release the bolt.

For convenience I have formed the recessed end of the stud with flat sides so that a wrench may be applied thereto when necessary.

I claim:

1. A bolt, comprising a stud threaded adjacent one end thereof, a nut adapted to engage said threads, an abutment provided on said stud between the ends thereof and having a protuberance intermediate its extremities extending in the direction of said threaded end, and a thrust member capable of moving transversely of said stud when engaged therewith adapted to abut against said protuberance.

2. A bolt comprising a stud threaded adjacent one end and provided with a recess defining an abutment adjacent the other end, a nut adapted to engage said threads, a protuberance on said abutment intermediate the extremities thereof and extending in the direction of said threaded end, and a U-washer adapted to engage in said recess and rest upon said protuberance.

3. A bolt comprising a stud threaded adjacent one end and provided with a recess defining an abutment adjacent the other end, a nut adapted to engage said threads, a protuberance on said abutment disposed centrally of the extremities thereof and extending in the direction of said threaded end, and a U-washer adapted to engage said stud by being moved into said recess from either end thereof and arranged when engaged therein to be supported on said protuberance in the same manner and corresponding relation with respect to the latter irrespective of which end of the recess said washer primarily enters.

In testimony whereof, I have hereunto set my hand at Oakland, California, this 13th day of January, 1921.

RALPH PINTO.

In presence of—
L. L. M. SALSBURY.